United States Patent
Duan et al.

(10) Patent No.: US 10,689,537 B2
(45) Date of Patent: Jun. 23, 2020

(54) DISPERSIONS OF HOLEY GRAPHENE MATERIALS AND APPLICATIONS THEREOF

(71) Applicant: THE REGENTS OF THE UNIVERSITY OF CALIFORNIA, Oakland, CA (US)

(72) Inventors: Xiangfeng Duan, Los Angeles, CA (US); Yuxi Xu, Los Angeles, CA (US); Yu Huang, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/576,249

(22) PCT Filed: May 26, 2016

(86) PCT No.: PCT/US2016/034352
§ 371 (c)(1),
(2) Date: Nov. 21, 2017

(87) PCT Pub. No.: WO2016/191564
PCT Pub. Date: Dec. 1, 2016

(65) Prior Publication Data
US 2018/0142114 A1    May 24, 2018

Related U.S. Application Data

(60) Provisional application No. 62/166,621, filed on May 26, 2015, provisional application No. 62/171,737, filed on Jun. 5, 2015.

(51) Int. Cl.
*C09D 11/52* (2014.01)
*C01B 32/184* (2017.01)
(Continued)

(52) U.S. Cl.
CPC ............ *C09D 11/52* (2013.01); *C01B 32/184* (2017.08); *C01B 32/192* (2017.08);
(Continued)

(58) Field of Classification Search
None
See application file for complete search history.

(56) References Cited

U.S. PATENT DOCUMENTS

| 2009/0061312 A1 | 3/2009 | Zhamu et al. |
| 2010/0144904 A1 | 6/2010 | Wang et al. |

(Continued)

FOREIGN PATENT DOCUMENTS

| CN | 103663438 A | 3/2014 |
| WO | WO-2014/134663 A1 | 9/2014 |

(Continued)

OTHER PUBLICATIONS

Chen, et al., "Self-Assembly and Embedding of Nanoparticles by In Situ Reduced Graphen for Preparation of a 3D Graphene/Nanoparticle Aerogel", Adv. Mater. 23: 5679-5683 (2011).
(Continued)

*Primary Examiner* — Katie L. Hammer
(74) *Attorney, Agent, or Firm* — Foley & Lardner LLP

(57) ABSTRACT

A method of forming a graphene-based material includes: (1) treating a mixture including an etchant and graphene oxide sheets to yield formation of holey graphene oxide sheets; (2) dispersing the holey graphene oxide sheets in a re-dispersal solvent to yield a holey graphene oxide dispersion including the holey graphene oxide sheets; and (3) treating the holey graphene oxide dispersion under reducing conditions to yield self-assembly of the holey graphene oxide sheets into a graphene-based material.

20 Claims, 10 Drawing Sheets

(51) Int. Cl.

| | |
|---|---|
| *C01B 32/198* | (2017.01) |
| *C09D 11/037* | (2014.01) |
| *C09D 11/322* | (2014.01) |
| *H01M 4/04* | (2006.01) |
| *H01M 4/88* | (2006.01) |
| *C01B 32/23* | (2017.01) |
| *C01B 32/192* | (2017.01) |
| *B82Y 30/00* | (2011.01) |
| *B82Y 40/00* | (2011.01) |
| *H01G 11/32* | (2013.01) |
| *H01G 11/86* | (2013.01) |

(52) U.S. Cl.
CPC ............ *C01B 32/198* (2017.08); *C01B 32/23* (2017.08); *C09D 11/037* (2013.01); *C09D 11/322* (2013.01); *H01M 4/0404* (2013.01); *H01M 4/8828* (2013.01); *B82Y 30/00* (2013.01); *B82Y 40/00* (2013.01); *C01B 2204/22* (2013.01); *C01P 2006/16* (2013.01); *H01G 11/32* (2013.01); *H01G 11/86* (2013.01); *Y10S 977/734* (2013.01); *Y10S 977/842* (2013.01); *Y10S 977/948* (2013.01)

(56) References Cited

U.S. PATENT DOCUMENTS

| | | | |
|---|---|---|---|
| 2010/0303706 A1 | 12/2010 | Wallace et al. | |
| 2013/0022873 A1* | 1/2013 | von Bulow | B82Y 30/00 429/221 |
| 2013/0040283 A1* | 2/2013 | Star | G01N 27/127 435/5 |
| 2013/0180912 A1* | 7/2013 | Li | B01D 67/0079 210/500.21 |
| 2014/0079932 A1* | 3/2014 | Aksay | B82Y 30/00 428/219 |
| 2014/0087192 A1 | 3/2014 | Lai et al. | |
| 2014/0098461 A1* | 4/2014 | Zhamu | H01G 11/36 361/502 |
| 2015/0086977 A1 | 3/2015 | Star et al. | |

FOREIGN PATENT DOCUMENTS

| | | |
|---|---|---|
| WO | WO-2015/015120 A2 | 2/2015 |
| WO | WO-2015/069332 A1 | 5/2015 |

OTHER PUBLICATIONS

Eurasian First Office Action, issued in Eurasian Patent Application No. 201792363, 9 pages (dated Oct. 31, 2018).

European Supplementary Search Report, issued in European Patent Application No. 16800717.7, 11 pages (dated Dec. 7, 2018).

Xu, et al., "Flexible solid-state supercapacitors based on three-dimensional graphene hydrogel films", ACS Nano 7(5): 4042-4049 (2013).

Xu, et al., "Self-Assembled Graphene Hydrogel via a One-Step Hydrothermal Process", ACS Nano 4(7): 4324-4330 (2010).

Huang X et al. (2014), "A rational design of carbon-supported dispersive Pt-based octahedral as efficient oxygen reduction reaction catalysts", Energy & Environmental Science, vol. 7, No. 9, pp. 2957-2962.

International Search Report and Written Opinion for International Application No. PCT/US2016/034352 dated Sep. 12, 2016, 12 pages.

Xu Y et al. (2013), "One-step strategy to grapheme/Ni(OH)2 composite hydrogels as advanced three-dimensional supercapacitor electrode materials", Nano Research, vol. 6, No. 1, pp. 65-76.

Xu Y et al. (2014), "Holey grapheme frameworks for highly efficient capacitive energy storage", Nature Communications, vol. 5, article No. 4554, pp. 1-8.

First Examination Report issued in Australian Patent Application No. 2016268388 dated Oct. 25, 2019, 3 pages.

Dhand et al., "A Comprehensive Review of Graphene Nanocomposites: Research Status and Trends", Journal of Nanomaterials, vol. 2013, Article ID No. 763953, 2013, pp. 1-14.

Examination Report for in Application No. 201727043569 dated Feb. 5, 2020, 6 pages.

Second Office Action on EA Application No. 201792363 dated Feb. 19, 2020, 11 pages. (English Translation).

Official Action on JP Application No. 2017-561350 dated Apr. 9, 2020, 7 pages (English Translation).

\* cited by examiner

US 10,689,537 B2

DISPERSIONS OF HOLEY GRAPHENE MATERIALS AND APPLICATIONS THEREOF

CROSS REFERENCE TO RELATED APPLICATIONS

This application is a National Stage Entry of International Application No. PCT/US2016/034352, filed on May 26, 2016, which claims the benefit of U.S. Provisional Application Ser. No. 62/166,621, filed on May 26, 2015, and the benefit of U.S. Provisional Application Ser. No. 62/171,737, filed on Jun. 5, 2015, the contents of which are incorporated herein by reference in their entireties.

TECHNICAL FIELD

This disclosure generally relates to holey graphene materials and, more particularly, to dispersions of holey graphene materials and applications of such dispersions.

BACKGROUND

Graphene has been anticipated for revolutionizing a wide range of technological areas due to its multiple remarkable physical and chemical properties. However, pristine graphene or chemically converted graphene sheets, with extended π-conjugation in the basal plane, are prone to restack with each other via π-π stacking interaction and van der Waals force to form irreversible agglomerates, resulting in a significant deterioration of their properties including severely reduced specific surface area and much lower mass diffusion rate. In addition, the restacking of graphene sheets usually yields graphite-like powders, which involves additional processing procedures or inclusion of passive additives (e.g., binders for electrochemistry applications) to fabricate the ultimate products, which can further degrade the overall performance. Free-standing monolithic graphene materials with the properties of individual graphene sheets well maintained are highly desired but a great challenge for many applications of graphene, especially for electrochemical energy storage and conversion devices. To effectively exploit the unusual attributes of graphene for many proposed applications, there are at least two major prerequisites. One is the availability of solution processable graphene and its chemical derivatives in large quantities. The other is to mitigate against the re-stacking induced property deterioration when the graphene sheets are processed into bulk materials.

It is against this background that a need arose to develop the embodiments described herein.

SUMMARY

Scalable preparation of solution processable graphene and its bulk materials with high specific surface areas and designed porosities are desired for many practical applications. Herein, some embodiments of this disclosure are directed to a scalable approach to produce dispersions (e.g., aqueous dispersions) of holey graphene oxide with abundant in-plane nanopores via a convenient mild defect-etching reaction, and demonstrate that the holey graphene oxide can function as a versatile building block for the assembly of macrostructures including holey graphene hydrogels with a three-dimensional hierarchical porosity and holey graphene papers with a compact but porous layered structure. These holey graphene macrostructures exhibit significantly improved specific surface area and ion diffusion rate compared to the non-holey counterparts, and can be directly used as binder-free supercapacitor electrodes with ultrahigh specific capacitances of about 283 F/g (or more) and about 234 F/cm$^3$ (or more), excellent rate capabilities and superior cycling stabilities. More generally, the gravimetric capacitance at a current density of about 1 A/g (or about 10 A/g or about 20 A/g or another higher or lower current density) can be at least about 160 F/g, at least about 180 F/g, at least about 200 F/g, at least about 220 F/g, at least about 240 F/g, at least about 250 F/g, at least about 260 F/g, or at least about 280 F/g, and up to about 320 F/g, up to about 360 F/g, up to about 400 F/g, up to about 440 F/g, or more, and the volumetric capacitance at a current density of about 1 A/g (or about 10 A/g or about 20 A/g or another higher or lower current density) can be at least about 140 F/cm$^3$, at least about 160 F/cm$^3$, at least about 180 F/cm$^3$, at least about 200 F/cm$^3$, or at least about 210 F/cm$^3$, and up to about 240 F/cm$^3$, up to about 280 F/cm$^3$, up to about 320 F/cm$^3$, up to about 360 F/cm$^3$, or more. Embodiments of this disclosure provide a scalable pathway to solution processable holey graphene materials, and will greatly impact the applications of graphene in diverse technological areas.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Figure 1:
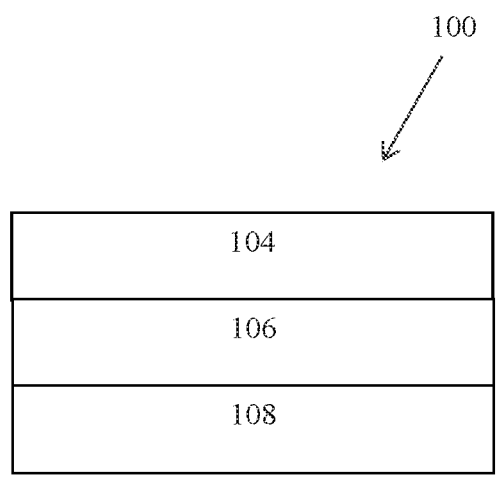
FIG. 1: Schematic of a supercapacitor.

Graphene is desirable as a supercapacitor electrode material (among other applications) because of its high intrinsic electrical conductivity, excellent mechanical flexibility, an exceptionally large theoretical surface area of about 2630 $m^2/g$, and a theoretical gravimetric capacitance of about 550 F/g. However, because there is a strong π-π interaction between graphene sheets, they tend to re-stack to form graphite-like powders or films, which can severely decrease the surface area and reduce the ion diffusion rate, resulting in unsatisfactory gravimetric capacitances (typically <180 F/g in organic electrolytes) and relatively low charging/discharging rates. Another figure-of-merit to evaluate an electrode material for supercapacitors, in addition to gravimetric capacitance, is volumetric capacitance. There is typically a trade-off between gravimetric and volumetric capacitances for most electrode designs. For example, a highly porous electrode can offer a large specific surface area and can favor ion diffusion for high gravimetric capacitance, but may have a lower volumetric capacitance due to its relatively low packing density. On the other hand, a more compact electrode can boost the volumetric capacitance but decrease the ion-accessible surface area and ion diffusion rate, resulting in a lower gravimetric capacitance and poor rate performance. Therefore, there is a formidable challenge to both achieve high gravimetric and volumetric capacitances while retaining excellent rate capability, which is desired for the development of practical supercapacitors with high energy and power densities.

As will be understood, graphene is an allotrope of carbon, and its structure is typically one-atom-thick sheets of $sp^2$-bonded carbon atoms that are packed in a honeycomb crystal lattice. In some embodiments, graphene is provided in the form of thin sheets of substantially a monolayer of carbon atoms that can be envisioned as unrolled carbon nanotubes, although a bilayer or other multilayer of graphene is also contemplated.

In some embodiments, a method of forming a graphene-based material includes: (1) treating a mixture including an etchant and graphene oxide sheets to yield formation of holey graphene oxide sheets; (2) re-dispersing the holey graphene oxide sheets in a re-dispersal solvent to yield a holey graphene oxide dispersion including the holey graphene oxide sheets; and (3) treating the holey graphene oxide dispersion under reducing conditions to yield self-assembly of the holey graphene oxide sheets into a graphene-based material.

In some embodiments of the method, treating the mixture in (1) includes heating the mixture at a temperature in a range of, for example, about 50° C. to about 200° C., or about 80° C. to about 150° C., or at about 100° C. for a time interval in a range of, for example, about 1 h to about 10 h, or about 2 h to about 6 h, or about 4 h, under stirring or other manner of agitation. In some embodiments of the method, the etchant in (1) can be, for example, hydrogen peroxide ($H_2O_2$).

In some embodiments of the method, the holey graphene oxide sheets in (1) have basal-plane or in-plane nanopores formed in the holey graphene oxide sheets, and the nanopores can have sizes from about 1 nm, from about 2 nm, from about 3 nm, from about 4 nm, or from about 5 nm, and up to about 10 nm, up to about 20 nm, up to about 50 nm, up to about 100 nm, or more. For example, the basal-plane nanopores can have sizes from about 1 nm to about 100 nm or from about 1 nm to about 10 nm. As another example, the basal-plane nanopores can have sizes up to, or less than, about 1 nm; up to, or less than, about 1.5 nm; up to, or less than, about 2 nm; up to, or less than, about 3 nm; up to, or less than, about 5 nm; up to, or less than, about 10 nm; up to, or less than, about 20 nm; or up to, or less than, about 50 nm. In some embodiments, pore sizes can be characterized according to Barrett-Joyner-Halenda pore size distribution.

In some embodiments of the method, the re-dispersal solvent in (2) is, or includes, water to form an aqueous dispersion of the holey graphene oxide sheets. Other examples of suitable re-dispersal solvents include hydrophilic solvents, such as ionic liquids, alcohols, amides, and other polar aprotic or polar protic organic solvents. In some embodiments of the method, a concentration of the holey graphene oxide sheets in the holey graphene oxide dispersion in (2) is from about 0.05 mg/mL, from about 0.1 mg/mL, from about 0.2 mg/mL, from about 0.3 mg/mL, from about 0.4 mg/mL, from about 0.5 mg/mL, from about 1 mg/mL, or from about 1.5 mg/mL, and up to about 5 mg/mL, up to about 10 mg/mL, up to about 20 mg/mL, or more.

In some embodiments of the method, treating the holey graphene oxide dispersion in (3) includes heating the dispersion at a temperature in a range of, for example, about 50° C. to about 200° C., or about 80° C. to about 150° C., or about 100° C. for a time interval in a range of, for example, about 0.5 h to about 10 h, or about 1 h to about 3 h, or about 2 h. In some embodiments, heating the dispersion is in the presence of one or more suitable reducing agents, such as sodium ascorbate. In some embodiments of the method, treating the holey graphene oxide dispersion in (3) yields reduction and self-assembly of the holey graphene oxide sheets into a graphene-based hydrogel including an interconnected porous network of holey graphene sheets. The resulting hydrogel can feature a high surface area, a high electrical conductivity, a high ion transport rate, and a high mechanical strength. For example, a specific surface area (SSA) of the hydrogel can be at least about 1000 $m^2/g$, at least about 1100 $m^2/g$, at least about 1200 $m^2/g$, at least about 1300 $m^2/g$, at least about 1400 $m^2/g$, or at least about 1500 $m^2/g$, and up to about 1700 $m^2/g$, up to about 2000 $m^2/g$, up to about 2300 $m^2/g$, or up to about 2500 $m^2/g$, or more. In some embodiments, the SSA can be characterized according to methylene blue (MB) dye adsorption method. In some embodiments, the holey graphene sheets in the hydrogel are highly interconnected and interlocked together to mitigate against their re-stacking and to maintain a monolithic structure. The interlocked holey graphene sheets can be subjected to compaction to form a free-standing, dense film, with little or no re-stacking to achieve a high packing density.

The resulting graphene-based material in (3) can be used as an electrode material for supercapacitors. Also, the material can function as a desirable backbone or scaffold structure for the assembly integration of a pseudo-capacitive material (e.g., transition metal oxide or hydroxide, such as in the form of nanostructures formed of ruthenium oxide (e.g., $RuO_2$), manganese oxide (e.g., $MnO_2$), nickel oxide (e.g., NiO), cobalt oxide (e.g., $Co_2O_3$ or $Co_3O_4$), nickel hydroxide (e.g., $Ni(OH)_2$), and mixed transition metal oxides and hydroxides) for the construction of high energy density supercapacitors; a nanoscale battery anode electrochemically active material (e.g., nanostructures formed of graphite, silicon, tin, or other active anode material for lithium-ion batteries) for the construction of high power density batteries, a nanoscale battery cathode electrochemically active material (e.g., nanostructures formed of sulfur, phosphorus, cobalt oxide (e.g., $CoO_2$), lithium iron phosphate (e.g., $LiFePO_4$), lithium oxide (e.g., $LiO_2$ or $Li_2O_2$), or other active cathode material for lithium-ion batteries) for the construction of high power density batteries; or an oxygen reduction reaction (ORR) or oxygen evolution reaction (OER) catalyst (e.g., nanostructures formed of platinum or platinum-containing alloy (e.g., Pt, PtNi, or PtNiMo) or cobalt phosphate) for the construction of highly efficient fuel cells or air batteries. The nanostructures can have at least one dimension or extent in a range of about 1 nm to about 200 nm. The nanostructures can be first loaded onto the holey graphene oxide sheets in (1) or (2), which can then be used as building blocks for assembly to yield the graphene-based material in (3). Alternatively, or in conjunction, the nanostructures can be integrated into a pre-assembled graphene-based material for the construction of an electrode material. Thus, some embodiments of the method can also include incorporating a pseudo-capacitive material, an electrochemically active material, or a catalyst into the graphene-based material, prior to or subsequent to self-assembly of the holey graphene oxide sheets in (3). A mass loading of the pseudo-capacitive material, the electrochemically active material, or the catalyst in the graphene-based material can be about 1 wt. % or more, about 5 wt. % or more, about 10 wt. % or more, about 15 wt. % or more, or about 20 wt. % or more, and up to about 30 wt. % or more or up to about 50 wt. % or more.

In some embodiments, a method of forming a graphene-based material includes: (1) treating a mixture including an etchant and graphene oxide sheets to yield formation of holey graphene oxide sheets; (2) re-dispersing the holey graphene oxide sheets in a re-dispersal solvent to yield a holey graphene oxide dispersion including the holey graphene oxide sheets; (3) treating the holey graphene oxide dispersion under reducing conditions to yield a holey graphene dispersion including holey graphene sheets; and (4) subjecting the holey graphene sheets to compaction to yield a graphene-based material.

In some embodiments of the method, treating the mixture in (1) includes heating the mixture at a temperature in a range of, for example, about 50° C. to about 200° C., or about 80° C. to about 150° C., or at about 100° C. for a time interval in a range of, for example, about 1 h to about 10 h, or about 2 h to about 6 h, or about 4 h, under stirring or other manner of agitation. In some embodiments of the method, the etchant in (1) can be, for example, hydrogen peroxide ($H_2O_2$).

In some embodiments of the method, the holey graphene oxide sheets in (1) have basal-plane or in-plane nanopores formed in the holey graphene oxide sheets, and the nanopores can have sizes from about 1 nm, from about 2 nm, from about 3 nm, from about 4 nm, or from about 5 nm, and up to about 10 nm, up to about 20 nm, up to about 50 nm, up to about 100 nm, or more. For example, the basal-plane nanopores can have sizes from about 1 nm to about 100 nm or from about 1 nm to about 10 nm. As another example, the basal-plane nanopores can have sizes up to, or less than, about 1 nm; up to, or less than, about 1.5 nm; up to, or less than, about 2 nm; up to, or less than, about 3 nm; up to, or less than, about 5 nm; up to, or less than, about 10 nm; up to, or less than, about 20 nm; or up to, or less than, about 50 nm. In some embodiments, pore sizes can be characterized according to Barrett-Joyner-Halenda pore size distribution.

In some embodiments of the method, the re-dispersal solvent in (2) is, or includes, water to form an aqueous dispersion of the holey graphene oxide sheets. Other examples of suitable re-dispersal solvents include hydrophilic solvents, such as ionic liquids, alcohols, amides, and other polar aprotic or polar protic organic solvents. In some embodiments of the method, a concentration of the holey graphene oxide sheets in the holey graphene oxide dispersion in (2) is from about 0.05 mg/mL, from about 0.1 mg/mL, from about 0.2 mg/mL, from about 0.3 mg/mL, from about 0.4 mg/mL, from about 0.5 mg/mL, from about 1 mg/mL, or from about 1.5 mg/mL, and up to about 5 mg/mL, up to about 10 mg/mL, up to about 20 mg/mL, or more.

In some embodiments of the method, treating the holey graphene oxide dispersion in (3) includes heating the dispersion at a temperature in a range of, for example, about 50° C. to about 200° C., or about 80° C. to about 150° C., or about 95° C. for a time interval in a range of, for example, about 0.5 h to about 10 h, or about 1 h to about 3 h, or about 1 h. In some embodiments, heating the dispersion is in the presence of one or more suitable reducing agents, such as ammonia, hydrazine, or a combination thereof. In some embodiments of the method, treating the holey graphene oxide dispersion in (3) yields reduction of the holey graphene oxide sheets into the holey graphene sheets.

In some embodiments of the method, subjecting the holey graphene sheets to compaction in (4) includes performing flow-assisted or flow-directed compaction of the holey graphene dispersion through a filter. In some embodiments of the method, compaction of the holey graphene dispersion yields a graphene-based paper including a compact layered structure of holey graphene sheets. The resulting graphene-based paper can feature a high surface area, a high electrical conductivity, a high ion transport rate, and a high mechanical strength. For example, a SSA of the graphene-based paper can be at least about 20 $m^2/g$, at least about 50 $m^2/g$, at least about 70 $m^2/g$, at least about 80 $m^2/g$, at least about 90 $m^2/g$, at least about 100 $m^2/g$, at least about 130 $m^2/g$, at least about 150 $m^2/g$, at least about 170 $m^2/g$, or at least about 200 $m^2/g$, and up to about 230 $m^2/g$, up to about 250 $m^2/g$, or more. As another example, and through flow-assisted or flow-directed compaction or other manner of compaction, a packing density of the graphene-based paper can be at least about 0.2 $g/cm^3$, at least about 0.3 $g/cm^3$, at least about 0.4 $g/cm^3$, at least about 0.5 $g/cm^3$, at least about 0.6 $g/cm^3$, at least about 0.7 $g/cm^3$, at least about 0.8 $g/cm^3$, at least about 0.9 $g/cm^3$, at least about 1 $g/cm^3$, or at least about 1.1 $g/cm^3$, and up to about 1.2 $g/cm^3$, up to about 1.4 $g/cm^3$, or more. As a further example, an electrical conductivity of the graphene-based paper can be at least about 500 S/m, at least about 600 S/m, at least about 700 S/m, at least about 800 S/m, at least about 900 S/m, at least about 1000 S/m, at least about 1300 S/m, at least about 1500 S/m, or at least about 2000 S/m, and up to about 2100 S/m, up to about 2200 S/m, up to about 2300 S/m, or more.

The resulting graphene-based material in (4) can be used as an electrode material for supercapacitors. Also, the material can function as a desirable backbone or scaffold structure for the assembly integration of a pseudo-capacitive material (e.g., transition metal oxide or hydroxide, such as in the form of nanostructures formed of ruthenium oxide (e.g., $RuO_2$), manganese oxide (e.g., $MnO_2$), nickel oxide (e.g., NiO), cobalt oxide (e.g., $Co_2O_3$ or $Co_3O_4$), nickel hydroxide (e.g., $Ni(OH)_2$), and mixed transition metal oxides and hydroxides) for the construction of high energy density supercapacitors; a nanoscale battery anode electrochemically active material (e.g., nanostructures formed of graphite, silicon, tin, or other active anode material for lithium-ion batteries) for the construction of high power density batteries, a nanoscale battery cathode electrochemically active material (e.g., nanostructures formed of sulfur, phosphorus, cobalt oxide (e.g., $CoO_2$), lithium iron phosphate (e.g., $LiFePO_4$), lithium oxide (e.g., $LiO_2$ or $Li_2O_2$), or other active cathode material for lithium-ion batteries) for the construction of high power density batteries; or an ORR or OER catalyst (e.g., nanostructures formed of platinum or platinum-containing alloy (e.g., Pt, PtNi, or PtNiMo) or cobalt phosphate) for the construction of highly efficient fuel cells or air batteries. The nanostructures can have at least one dimension or extent in a range of about 1 nm to about 200 nm. The nanostructures can be first loaded onto the holey graphene oxide sheets in (1) or (2) or onto the holey graphene sheets in (3), which can then be used as building blocks for assembly to yield the graphene-based material in (4). Alternatively, or in conjunction, the nanostructures can be integrated into a pre-assembled graphene-based material for the construction of an electrode material. Thus, some embodiments of the method can also include incorporating a pseudo-capacitive material, an electrochemically active material, or a catalyst into the graphene-based material, prior to or subsequent to compaction of the holey graphene sheets in (4). A mass loading of the pseudo-capacitive material, the electrochemically active material, or the catalyst in the graphene-based material can be about 1 wt. % or more, about 5 wt. % or more, about 10 wt. % or more, about 15 wt. % or more, about 20 wt. % or more, and up to about 30 wt. % or more or up to about 50 wt. % or more.

In some embodiments, a dispersion of a graphene-based material includes a liquid solvent and holey graphene oxide sheets dispersed in the solvent. In some embodiments of the dispersion, the holey graphene oxide sheets have basal-plane or in-plane nanopores formed in the holey graphene oxide sheets, and the nanopores can have sizes from about 1 nm, from about 2 nm, from about 3 nm, from about 4 nm, or from about 5 nm, and up to about 10 nm, up to about 20 nm, up to about 50 nm, up to about 100 nm, or more. For example, the basal-plane nanopores can have sizes from about 1 nm to about 100 nm or from about 1 nm to about 10 nm. As another example, the basal-plane nanopores can have sizes up to, or less than, about 1 nm; up to, or less than, about 1.5 nm; up to, or less than, about 2 nm; up to, or less than, about 3 nm; up to, or less than, about 5 nm; up to, or less than, about 10 nm; up to, or less than, about 20 nm; or up to, or less than, about 50 nm. In some embodiments, pore sizes can be characterized according to Barrett-Joyner-Halenda pore size distribution. In some embodiments of the dispersion, the solvent is, or includes, water to form an aqueous dispersion of the holey graphene oxide sheets. Other examples of suitable solvents include hydrophilic solvents, such as ionic liquids, alcohols, amides, and other polar aprotic or polar protic organic solvents. In some embodiments of the dispersion, a concentration of the holey graphene oxide sheets in the dispersion is from about 0.05 mg/mL, from about 0.1 mg/mL, from about 0.2 mg/mL, from about 0.3 mg/mL, from about 0.4 mg/mL, from about 0.5 mg/mL, from about 1 mg/mL, or from about 1.5 mg/mL, and up to about 5 mg/mL, up to about 10 mg/mL, up to about 20 mg/mL, or more. In some embodiments of the dispersion, the dispersion is substantially devoid of an etchant, such as hydrogen peroxide, such that a concentration of the etchant in the dispersion is no greater than about 0.1 M, no greater than about 0.05 M, no greater than about 0.01 M, no greater than about 0.005 M, or no greater than about 0.001 M. In some embodiments of the dispersion, the holey graphene oxide sheets are decorated with, or otherwise loaded with, inorganic nanostructures, such as, for example, formed of graphite, silicon, tin, sulfur, phosphorus, $CoO_2$, $LiFePO_4$, $LiO_2$, $Li_2O_2$, Pt, PtNi, PtNiMo, or cobalt phosphate. The nanostructures can have at least one dimension or extent in a range of about 1 nm to about 200 nm.

In some embodiments, a dispersion of a graphene-based material includes a liquid solvent, holey graphene oxide sheets dispersed in the solvent, and additional solution-dispersible inorganic nanostructures dispersed in the solvent. In some embodiments of the dispersion, the holey graphene oxide sheets have basal-plane or in-plane nanopores formed in the holey graphene oxide sheets, and the nanopores can have sizes from about 1 nm, from about 2 nm, from about 3 nm, from about 4 nm, or from about 5 nm, and up to about 10 nm, up to about 20 nm, up to about 50 nm, up to about 100 nm, or more. For example, the basal-plane nanopores can have sizes from about 1 nm to about 100 nm or from about 1 nm to about 10 nm. As another example, the basal-plane nanopores can have sizes up to, or less than, about 1 nm; up to, or less than, about 1.5 nm; up to, or less than, about 2 nm; up to, or less than, about 3 nm; up to, or less than, about 5 nm; up to, or less than, about 10 nm; up to, or less than, about 20 nm; or up to, or less than, about 50 nm. In some embodiments, pore sizes can be characterized according to Barrett-Joyner-Halenda pore size distribution. In some embodiments of the dispersion, the solvent is, or includes, water to form an aqueous dispersion of the holey graphene oxide sheets. Other examples of suitable solvents include hydrophilic solvents, such as ionic liquids, alcohols, amides, and other polar aprotic or polar protic organic solvents. In some embodiments of the dispersion, a concentration of the holey graphene oxide sheets in the dispersion is from about 0.05 mg/mL, from about 0.1 mg/mL, from about 0.2 mg/mL, from about 0.3 mg/mL, from about 0.4 mg/mL, from about 0.5 mg/mL, from about 1 mg/mL, or from about 1.5 mg/mL, and up to about 5 mg/mL, up to about 10 mg/mL, up to about 20 mg/mL, or more. In some embodiments of the dispersion, the dispersion is substantially devoid of an etchant, such as hydrogen peroxide, such that a concentration of the etchant in the dispersion is no greater than about 0.1 M, no greater than about 0.05 M, no greater than about 0.01 M, no greater than about 0.005 M, or no greater than about 0.001 M. The inorganic nanostructures can be, for example, formed of graphite, silicon, tin, sulfur, phosphorus, $CoO_2$, $LiFePO_4$, $LiO_2$, $Li_2O_2$, Pt, PtNi, PtNiMo, or cobalt phosphate. The nanostructures can have at least one dimension or extent in a range of about 1 nm to about 200 nm.

In some embodiments, a dispersion of a graphene-based material includes a liquid solvent and holey graphene sheets dispersed in the solvent. In some embodiments of the dispersion, the holey graphene sheets have basal-plane or in-plane nanopores formed in the holey graphene sheets, and the nanopores can have sizes from about 1 nm, from about 2 nm, from about 3 nm, from about 4 nm, or from about 5 nm, and up to about 10 nm, up to about 20 nm, up to about 50 nm, up to about 100 nm, or more. For example, the basal-plane nanopores can have sizes from about 1 nm to about 100 nm or from about 1 nm to about 10 nm. As another example, the basal-plane nanopores can have sizes up to, or less than, about 1 nm; up to, or less than, about 1.5 nm; up to, or less than, about 2 nm; up to, or less than, about 3 nm; up to, or less than, about 5 nm; up to, or less than, about 10 nm; up to, or less than, about 20 nm; or up to, or less than, about 50 nm. In some embodiments, pore sizes can be characterized according to Barrett-Joyner-Halenda pore size distribution. In some embodiments of the dispersion, the solvent is, or includes, water to form an aqueous dispersion of the holey graphene sheets. Other examples of suitable solvents include hydrophilic solvents, such as ionic liquids, alcohols, amides, and other polar aprotic or polar protic organic solvents. In some embodiments of the dispersion, a concentration of the holey graphene sheets in the dispersion is from about 0.05 mg/mL, from about 0.1 mg/mL, from about 0.2 mg/mL, from about 0.3 mg/mL, from about 0.4 mg/mL, from about 0.5 mg/mL, from about 1 mg/mL, or from about 1.5 mg/mL, and up to about 5 mg/mL, up to about 10 mg/mL, up to about 20 mg/mL, or more. In some embodiments of the dispersion, the dispersion is substantially devoid of an etchant, such as hydrogen peroxide, such that a concentration of the etchant in the dispersion is no greater than about 0.1 M, no greater than about 0.05 M, no greater than about 0.01 M, no greater than about 0.005 M, or no greater than about 0.001 M. In some embodiments of the dispersion, the holey graphene sheets are decorated with, or otherwise loaded with, inorganic nanostructures, such as, for example, formed of graphite, silicon, tin, sulfur, phosphorus, $CoO_2$, $LiFePO_4$, $LiO_2$, $Li_2O_2$, Pt, PtNi, PtNiMo, or cobalt phosphate. The nanostructures can have at least one dimension or extent in a range of about 1 nm to about 200 nm.

In some embodiments, a dispersion of a graphene-based material includes a liquid solvent, holey graphene sheets dispersed in the solvent, and additional solution-dispersible inorganic nanostructures dispersed in the solvent. In some embodiments of the dispersion, the holey graphene sheets have basal-plane or in-plane nanopores formed in the holey graphene sheets, and the nanopores can have sizes from about 1 nm, from about 2 nm, from about 3 nm, from about 4 nm, or from about 5 nm, and up to about 10 nm, up to about 20 nm, up to about 50 nm, up to about 100 nm, or more. For example, the basal-plane nanopores can have sizes from about 1 nm to about 100 nm or from about 1 nm to about 10 nm. As another example, the basal-plane nanopores can have sizes up to, or less than, about 1 nm; up to, or less than, about 1.5 nm; up to, or less than, about 2 nm; up to, or less than, about 3 nm; up to, or less than, about 5 nm; up to, or less than, about 10 nm; up to, or less than, about 20 nm; or up to, or less than, about 50 nm. In some embodiments, pore sizes can be characterized according to Barrett-Joyner-Halenda pore size distribution. In some embodiments of the dispersion, the solvent is, or includes, water to form an aqueous dispersion of the holey graphene sheets. Other examples of suitable solvents include hydrophilic solvents, such as ionic liquids, alcohols, amides, and other polar aprotic or polar protic organic solvents. In some embodiments of the dispersion, a concentration of the holey graphene sheets in the dispersion is from about 0.05 mg/mL, from about 0.1 mg/mL, from about 0.2 mg/mL, from about 0.3 mg/mL, from about 0.4 mg/mL, from about 0.5 mg/mL, from about 1 mg/mL, or from about 1.5 mg/mL, and up to about 5 mg/mL, up to about 10 mg/mL, up to about 20 mg/mL, or more. In some embodiments of the dispersion, the dispersion is substantially devoid of an etchant, such as hydrogen peroxide, such that a concentration of the etchant in the dispersion is no greater than about 0.1 M, no greater than about 0.05 M, no greater than about 0.01 M, no greater than about 0.005 M, or no greater than about 0.001 M. The inorganic nanostructures can be, for example, formed of graphite, silicon, tin, sulfur, phosphorus, $CoO_2$, $LiFePO_4$, $LiO_2$, $Li_2O_2$, Pt, PtNi, PtNiMo, or cobalt phosphate. The nanostructures can have at least one dimension or extent in a range of about 1 nm to about 200 nm.

In some embodiments, a method of using the dispersion of any of the foregoing embodiments includes forming an ink composition including the dispersion for coating a thin film through ink-jet printing, screen coating, blade coating, spin coating, or other coating technique, followed by treating a resulting coating to form the thin film, such as through heating. In some embodiments, the thin film formed by the method is used to construct an electrode for an electrochemical energy storage device, such as, for example, selected from supercapacitors, pseudo-capacitors, batteries, and fuel cells.

FIG. 1 shows a schematic of a supercapacitor 100 that includes a pair of electrodes 104 and 108 and an electrolyte 106 that is disposed between the electrodes 104 and 108. Either one, or both, of the electrodes 104 and 108 can include, or can be formed of, a graphene-based material as described herein. Also, either one, or both, of the electrodes 104 and 108 can incorporate a pseudo-capacitive material in the graphene-based material. The electrolyte 106 can be an aqueous electrolyte, an organic electrolyte, or a gel electrolyte.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

This example reports a scalable approach to produce solution processable holey graphene oxide (HGO) with abundant in-plane nanopores via a convenient mild defect-etching reaction. The HGO sheets can be directly assembled into reduced HGO hydrogel (HGH) with a three-dimensional (3D) hierarchical porous network, and also can be chemically converted into solution processable reduced HGO (HG) which can be further assembled into HG papers (HGP) with a compact layered structure and inter-layer porosity. Both HGO derived macrostructures (HGH and HGP) exhibit significantly improved specific surface areas and much better ion diffusion dynamics compared to the non-holey graphene counterparts, and can function as binder-free supercapacitor electrodes with ultrahigh capacitive energy storage performance in various electrolytes, including aqueous, polymer gel and organic electrolytes.

Figure 2:
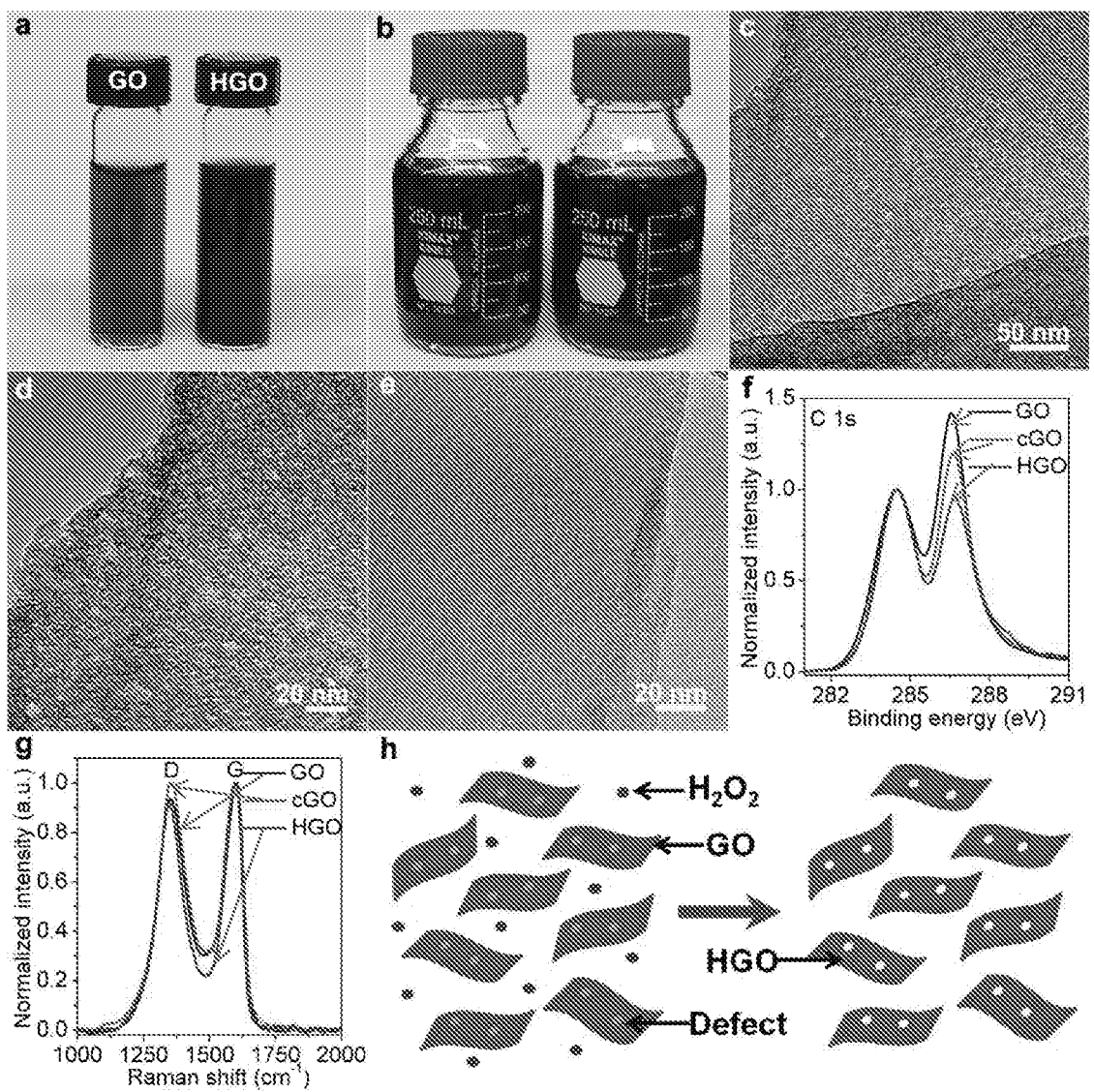
FIG. 2: Preparation and characterization of holey graphene oxide (HGO). (a) Photographs of aqueous dispersions of graphene oxide (GO) and HGO. (b) Photograph of large scale production of HGO aqueous dispersion with a concentration of about 2 mg/mL. (c) Low- and (d) high-magnification transmission electron microscopy (TEM) images of HGO. (e) TEM image of control GO (cGO) prepared in a control experiment. (f) C 1 s X-ray photoelectron spectroscopy (XPS) spectra normalized with respect to the C—C peak and (g) Raman spectra normalized with respect to the G peak for GO, cGO, and HGO. (h) Schematic illustration of formation mechanism of HGO.
Figure 8:
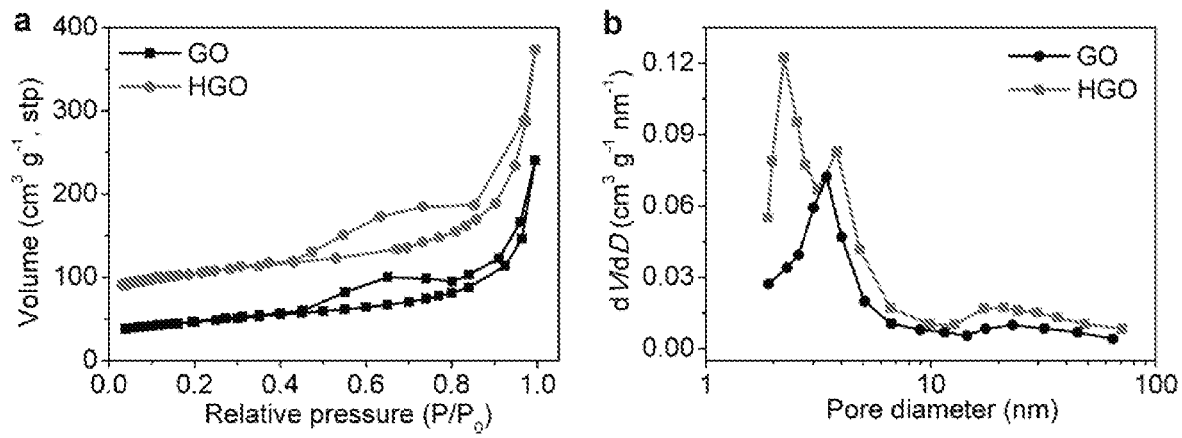
FIG. 8: (a) Nitrogen adsorption and desorption isotherms and (b) Barrett-Joyner-Halenda pore size distribution of freeze-dried HGO and GO.
Figure 9:
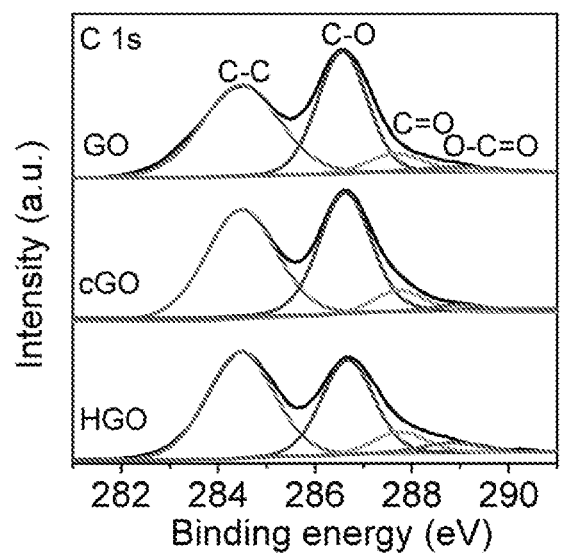
FIG. 9: Deconvoluted C is XPS profiles of GO, cGO and HGO.
Figure 10:
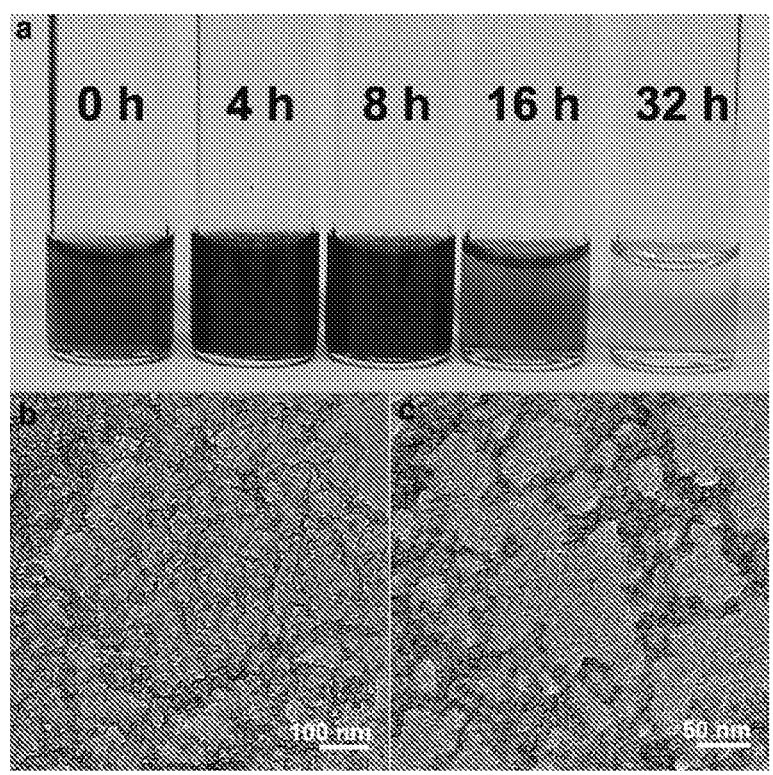
FIG. 10: (a) Photographs of resulting solutions under different reaction times during the preparation of HGO. TEM images of the products under the reaction time of about 8 h (b) and about 16 h (c).

The solution processable HGO can be prepared by heating a homogeneous aqueous mixture of GO and $H_2O_2$ (or another suitable etchant) at about 100° C. for about 4 h under stirring. After removing residual $H_2O_2$ by centrifuging and washing the reaction mixture, the HGO can be re-dispersed in water to form a stable aqueous dispersion with a high concentration of about 2 mg/mL (FIG. 2a). The ease-of-implementation makes the process readily scalable for large quantity production of HGO (FIG. 2b). Transmission electron microscopy (TEM) studies revealed abundant in-plane pores with sizes of a few nanometers across the whole basal plane of HGO (FIG. 2c,d), in contrast to nanopore-free control GO (cGO) sheets prepared in a control experiment with no $H_2O_2$ added (FIG. 2e), indicating an efficient etching of carbon atoms of GO by $H_2O_2$. Nitrogen adsorption-desorption tests showed the HGO exhibited a much higher Brunauer-Emmett-Teller specific surface area of about 430 $m^2/g$ versus GO (about 180 $m^2/g$) and a Barrett-Joyner-Halenda pore size distribution in the range of about 2-70 nm (FIG. 8). Particularly, the HGO showed a more prominent pore size distribution in the range of about 2-3 nm, which could be ascribed to the nanopores in the basal-plane of HGO. For understanding the formation mechanism of HGO, X-ray photoelectron spectroscopy (XPS) and Raman spectra are employed to characterize the structures of GO, cGO, and HGO. The cGO shows partial de-oxygenation (FIG. 2f) (see FIG. 9 for the deconvolution of each XPS spectrum) and increased intensity ratio of D peak to G peak (FIG. 2g) in comparison with GO, which is ascribed to the solvent-assisted thermal reduction. In contrast, the HGO shows more significant de-oxygenation than cGO and slightly decreased intensity ratio of D peak to G peak compared to GO, indicating that the HGO has fewer oxygen functionalities and fewer defects than the GO and cGO, which is unexpected due to the strong oxidation of $H_2O_2$. Given that the defect regions are distributed throughout the basal plane of GO and mainly includes interconnected oxygenated carbon species that are more chemically active than the graphitic area, it is proposed that the oxidative-etching reaction mainly initiate and propagate within the oxygenic defect regions, leading to the preferential removal of oxygenated carbon atoms and generation of carbon vacancies which gradually extend into nanopores in the basal plane (FIG. 2h). Extending the reaction time would lead to a more aggressive etching of GO, enlarging the pore size, breaking the sheets, and even destroying them completely (FIG. 10). It should be noted that the etching reaction of GO by $H_2O_2$ involves high temperature and sufficient amount of $H_2O_2$. In contrast, during the synthesis of GO (see Experimental Methods), the addition of a moderate amount of $H_2O_2$ to the reaction mixture near room temperature was primarily used to reduce the residual permanganate and manganese dioxide to manganese sulfate. In this way, most $H_2O_2$ was consumed rapidly and would not react with GO to produce porous structures in the basal plane.

Figure 3:
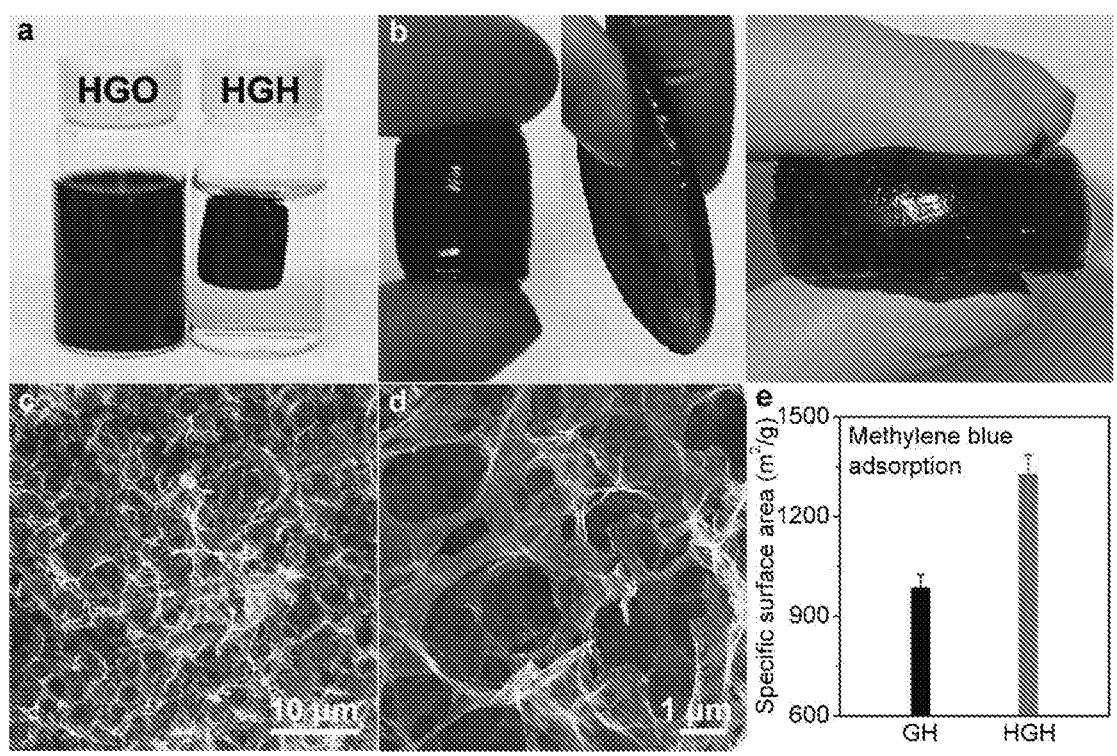
FIG. 3: Preparation and characterization of reduced HGO hydrogel (HGH). (a) Photographs of a HGO aqueous dispersion (about 2 mg/mL) and as-prepared HGH. (b) Photographs of a series of HGHs with different sizes and shapes. (c) Low- and (d) high-magnification scanning electron microscopy (SEM) images of the interior microstructures of freeze-dried HGH. (e) Specific surface areas of HGH and reduced GO hydrogel (GH) determined by methylene blue (MB) adsorption method.
Figure 11:
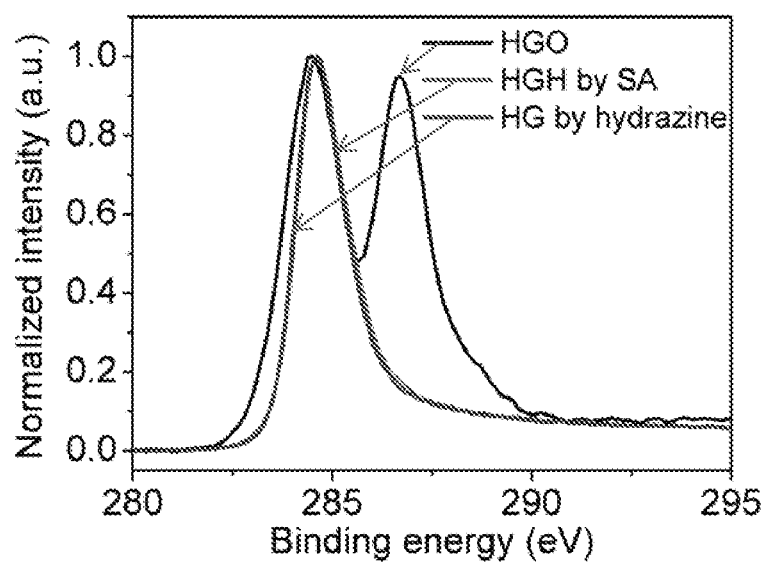
FIG. 11: C is XPS profiles of HGO, freeze-dried HGH, and HG.
Figure 12:
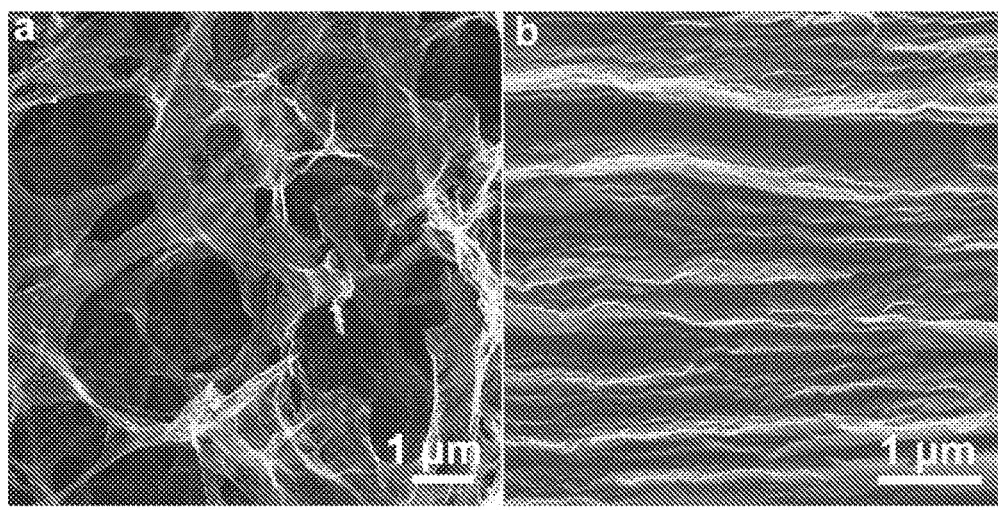
FIG. 12: SEM images of HGHs before (a) and after (b) mechanical pressing for preparation of supercapacitor electrodes. Although the apparent morphology of HGH changed from a porous network to a compact structure upon mechanical pressing, a robust interlock of graphene sheets in the 3D network can allow mechanical pressing to reduce the pore size of the network while largely maintaining the original stacking characteristics of graphene and its interconnected solvated porous structure, which is highly favorable for supercapacitor applications.

Similar to GO, the solution processable HGO can be directly used for a wide range of applications such as nanocomposites, biomaterials, and environmental remediation, and also provides a platform for rich solution chemistry including chemical reductions, covalent/non-covalent functionalizations, and supramolecular assembly. For example, the HGO dispersion can be used to prepare monolithic mechanically strong HGHs (FIG. 3a) via a reduction induced solution self-assembly process. As a control experiment, reduced GO hydrogels (GHs) are prepared under the same condition. XPS characterization indicated the HGO was sufficiently reduced with a significant de-oxygenation during the synthesis of HGH (FIG. 11). With the flexible processability of HGO dispersion, the sizes and shapes of HGH can be readily tailored by changing the type of reactors. The freeze-dried HGH showed an interconnected 3D porous network with a pore size ranging from sub-micrometers to several micrometers and pore walls of thin layers of stacked HG sheets, as revealed by scanning electron microscopy (SEM) (FIG. 3c,d). Methylene blue (MB) dye adsorption method was employed to determine specific surface areas (SSAs) of HGH and GH. The HGH showed a very high accessible SSA of about 1330 $m^2/g$, about 34% higher than that of GH (about 990 $m^2/g$), indicating that the nanopores in the basal plane of HG can efficiently promote species to diffuse into the stacked graphene layers within the pore walls and significantly increase the accessible surface area.

The unusual hierarchical porosity of HGH combining macropores arising from the 3D self-assembly of HG sheets with nanopores in the individual HG sheets makes it a highly desirable material for high-performance supercapacitor electrodes. Studies are performed of the electrochemical performances of symmetric supercapacitors based on HGH and GH films as binder-free electrodes, which were prepared by mechanical pressing of the corresponding hydrogels (FIG.

Figure 4:
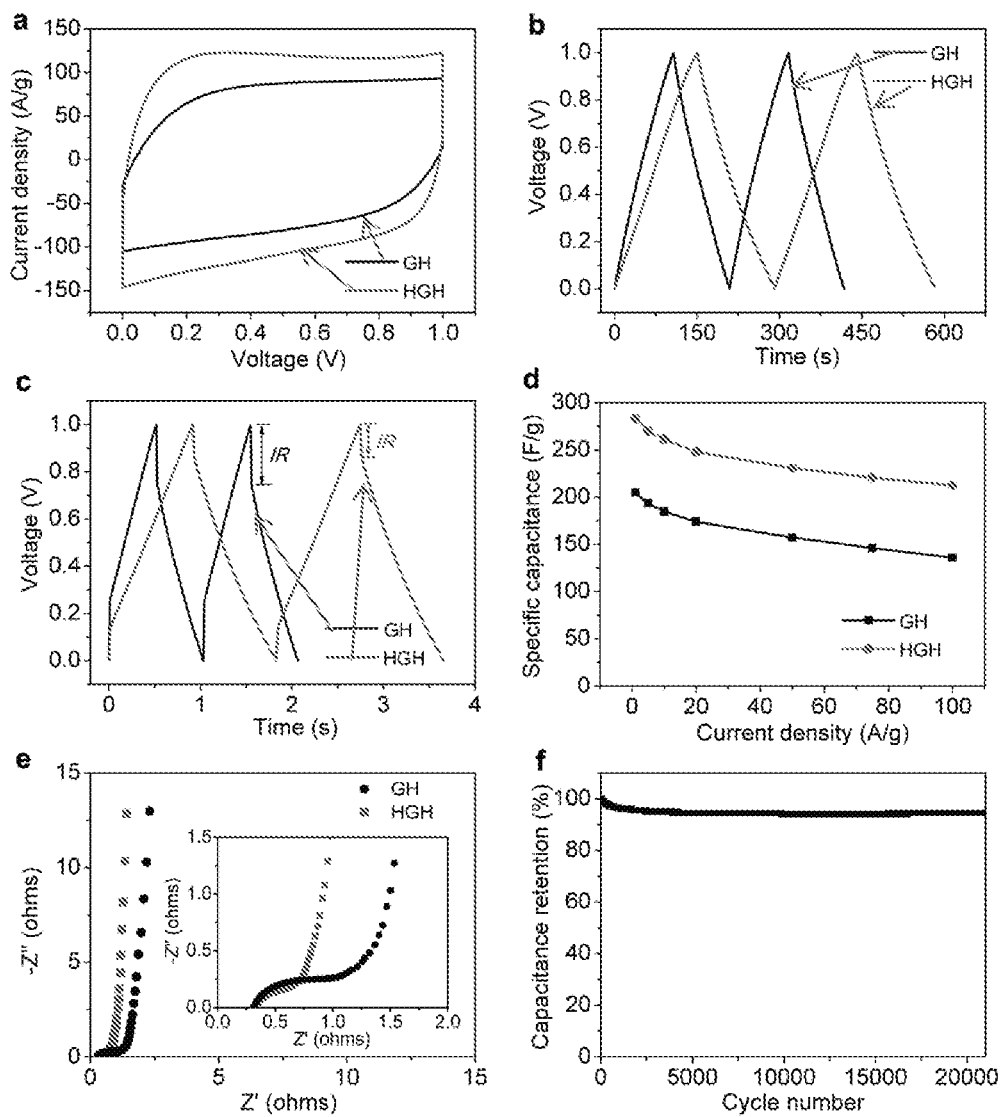
FIG. 4: Electrochemical characterizations of HGH- and GH-based supercapacitors in about 1.0 M H$_2$SO$_4$ aqueous electrolyte. (a) Cyclic voltammetry (CV) curves at a high san rate of about 1000 mV/s. (b,c) Galvanostatic charge/discharge curves at a current density of about 1 A/g (b) and about 100 A/g (c), respectively. (d) Specific capacitances versus current densities. (e) Nyquist plots with inset showing close-up views of the high-frequency regime. (f) Cycling stability of HGH-based supercapacitor at a current density of about 20 A/g.

12). Cyclic voltammetry (CV) studies showed a less oblique loop and larger current density for HGH compared to GH at a high scan rate of about 1000 mV/s (FIG. 4a), indicating that the HGH has a higher ion accessible SSA and faster ion diffusion rate than GH. The nearly rectangular CV curves and the nearly symmetric triangle galvanostatic charge/discharge curves (FIG. 4b,c) indicate a nearly ideal electrical-double-layer (EDL) capacitive characteristic for both HGH and GH. The HGH exhibited a specific capacitance of about 283 F/g at a current density of about 1 A/g, about 38% higher than that of GH (about 205 F/g) (FIG. 4b). When the current density was increased up to about 100 A/g, the HGH could retain as high as about 75% of its initial value (about 212 F/g), while the GH showed an about 66% capacitance retention (about 136 F/g) (FIG. 4d). Furthermore, the HGH showed a smaller voltage (IR) drop (about 0.14 V) than the GH (about 0.25 V) at the initial stage of the discharge curve at the current density of about 100 A/g (FIG. 4c), implying a lower equivalent series resistance (ESR) for HGH. The ion diffusion dynamics within the HGH and GH were further probed by electrochemical impedance spectroscopy (EIS) (FIG. 4e). The Nyquist plots obtained over a frequency range from about 100 kHz to about 10 mHz showed a vertical line in the low-frequency regime, indicating a nearly ideal capacitive property for HGH and GH. A close-up view of the high-frequency regime of the Nyquist plots revealed a semicircle with smaller diameter and a short 45° Warburg region for HGH, confirming a lower charge transfer resistance and more rapid ion diffusion within the HGH due to its hierarchical porosity. By extrapolating the vertical portion of the plot to the real axis, an ESR could be derived to be about 0.8 SΩ for HGH, almost half of that of GH (about 1.4 SΩ), which is consistent with the results of galvanostatic charge/discharge studies. Furthermore, the HGH also demonstrated excellent cycling stability with about 94% capacitance retention over 20,000 cycles at a high current density of about 20 A/g (FIG. 4f). The capacitance decay in the initial 1000 cycles could be ascribed to the removal of a few oxygen-containing groups on HG sheets that contribute to pseudocapacitance and electrode/electrolyte interface wetting.

By chemical reduction of the HGO dispersion, well-dispersed solution processable HG (FIG. 5a) can be obtained through electrostatic stabilization, which can be further assembled into large-area flexible HGP (FIG. 5b) with a compact layered structure (FIG. 5c) via a flow-directed self-assembly strategy. The HGP showed a SSA of about 217 m$^2$/g determined by the MB adsorption method, greatly higher than that of reduced GO paper (GP) (about 12 m$^2$/g) prepared under the same condition, indicating that the surface area of graphene within the HGP is highly accessible due to the nanopores in the HG sheets in spite of the compact stacking structure.

Figure 5:
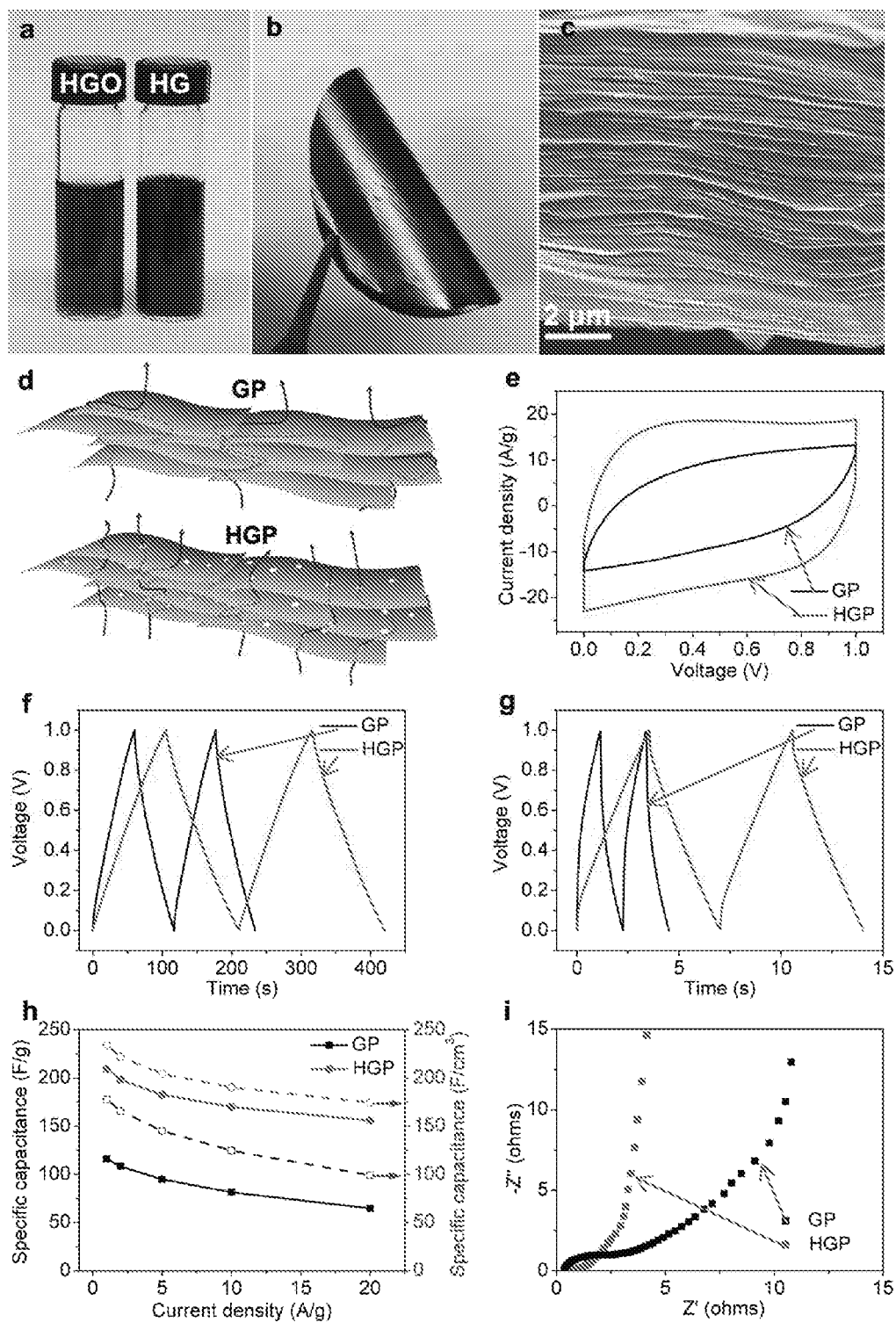
FIG. 5: Preparation and electrochemical characterizations of reduced holey graphene oxide paper (HGP)- and reduced graphene oxide paper (GP)-based supercapacitors in about 1.0 M $H_2SO_4$ aqueous electrolyte. (a) Photographs of aqueous dispersions of HGO and reduced graphene oxide (HG). (b) Photograph of a free-standing flexible HGP with a thickness of about 9 (c) SEM image of a cross-section of the HGP. (d) Schematic illustration of ion diffusion pathway across the GP and HGP. (e) CV curves at a san rate of about 200 mV/s. Galvanostatic charge/discharge curves at a current density of about 1 A/g (f) and about 20 A/g (g), respectively. (h) Specific capacitances versus current densities. (i) Nyquist plots.

Particularly, the effect of nanopores, which promoted ion diffusion and access to the graphene surface, will be more significant in compact papers than in 3D hydrogels (FIG. 5d), as confirmed by CV, galvanostatic charge/discharge, and EIS studies (FIG. 5e-i). The HGP exhibited a specific capacitance of about 209 and about 157 F/g at a current density of about 1 and about 20 A/g, respectively, which are considerably higher than those of GP (about 116 and about 65 F/g at about 1 and about 20 A/g, respectively) (FIG. 5h). The greatly improved electrochemical performance of HGP was also evidenced by Nyquist plots that showed a much smaller semicircle and a much shorter 45° Warburg region for HGP (FIG. 5i). With a high packing density of about 1.12 g/cm$^3$, the HGP could deliver an ultrahigh volumetric capacitance of about 234 F/cm$^3$, making it extremely desirable for high-volumetric-performance supercapacitor electrode which is increasingly important for many applications with space constraints such as miniaturized electronic devices.

Figure 6:
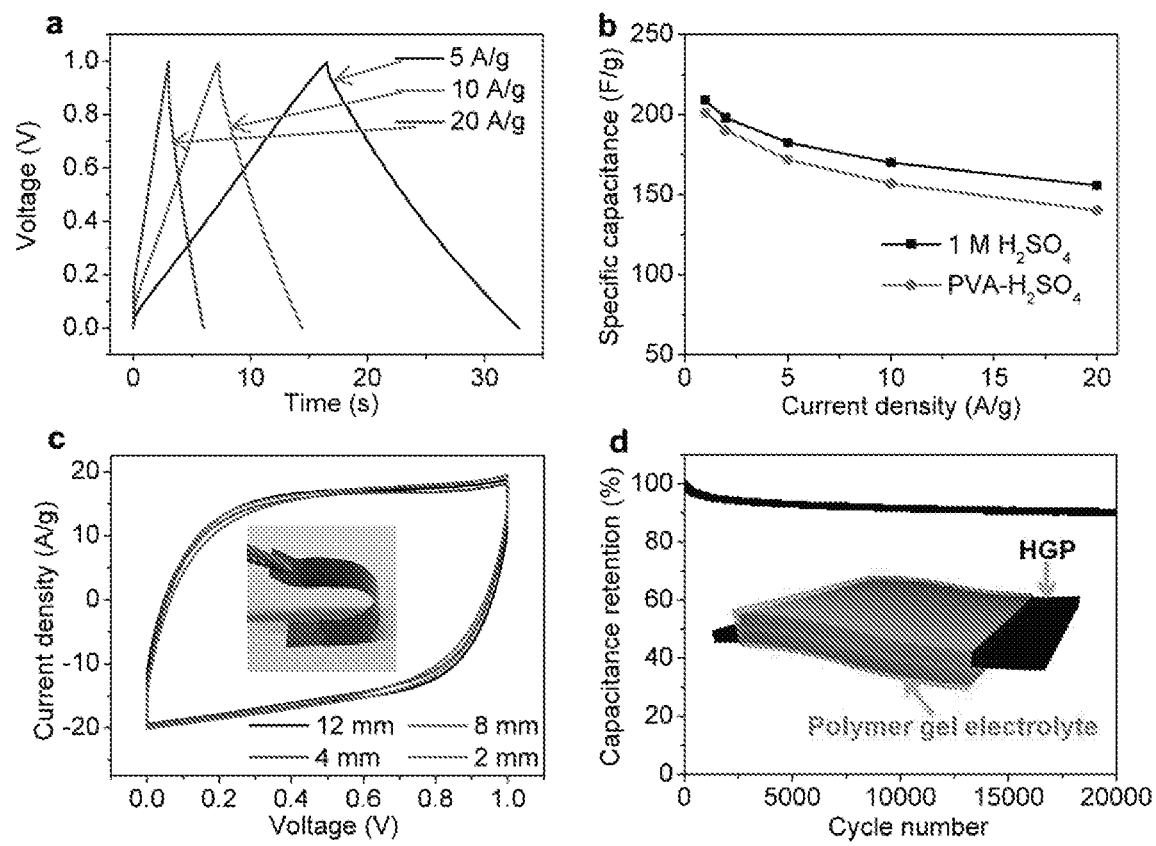
FIG. 6: Electrochemical characterization of HGP-based flexible solid-state supercapacitor. (a) Galvanostatic charge/discharge curves. (b) Specific capacitances versus current densities. (c) CV curves of the device at a scan rate of about 200 mV/s at different bending radius. The inset shows the flexibility of the device with a total thickness of about 30 (d) Cycling stability of the device at a current density of about 10 A/g at a bending radius of about 2 mm. The inset shows the schematic illustration of the device configuration.
Figure 13:
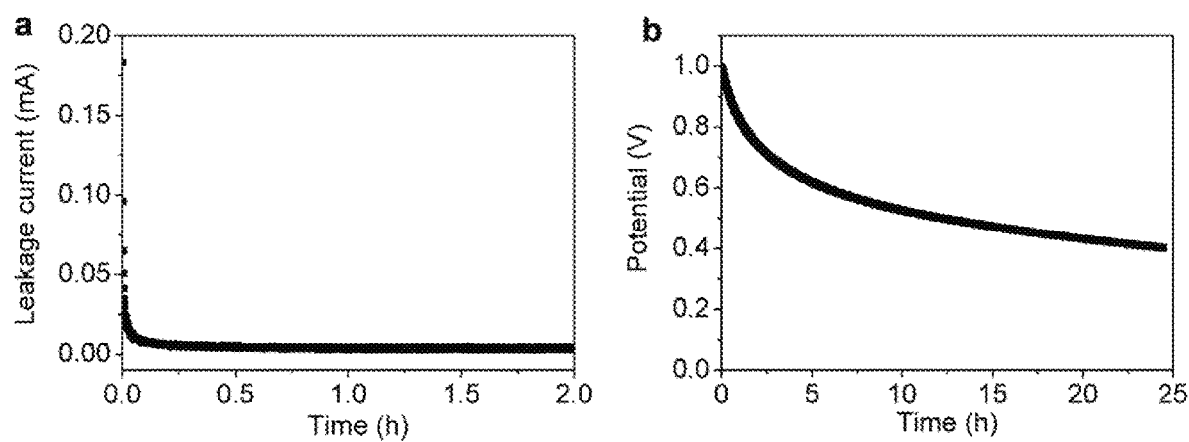
FIG. 13: (a) Leakage current curve of HGP-based solid-state supercapacitor charged at about 2 mA to about 1.0 V and kept at about 1.0 V for about 2 h. The device showed a low leakage current of about 4 μA. (b) Self-discharge curve of the device after charging at about 1.0 V for about 15 min. Normally, most supercapacitors are operated in the range of $V_{max}$ (the voltage at the beginning of discharge) to about ½ Thus, the time for the voltage across the device to change from $V_{max}$ to ½ $V_{max}$ was measured to be about 12.5 h, which is comparable to those of commercial supercapacitors with self-discharge rates of about 8 to about 20 h.

With flexible and wearable electronics becoming increasingly widespread, there is also a rising demand for high-performance flexible solid-state supercapacitors for power supply. However, other flexible solid-state devices typically use current collectors or supporting substrates for loading electrode materials because of either, or both, poor mechanical strength and low electrical conductivity. Meanwhile, the mass loading and the packing density of the electrode materials are typically low. All of these factors can greatly decrease the ratio of active electrode materials in the entire device and increase the mass or volume fraction of electrochemically passive components, leading to low specific capacitances when normalized by the total weight or volume of the entire device. In contrast, with a high electrical conductivity of about 2030 S/m, the mechanically strong HGP can be used to fabricate flexible solid-state ultrathin film supercapacitors without any current collectors or supporting substrates (FIG. 6). The entire device containing two about 9-μm-thick HGP electrodes showed a total thickness of about 30 μm, resulting in an ultrahigh volume ratio of about 60% for the active electrode materials in the ultimate device. With an efficient infiltration of polyvinyl alcohol (PVA)-H$_2$SO$_4$ gel electrolyte into the porosity of HGP, the HGP-based solid-state supercapacitor exhibited a high specific capacitance of about 201 and about 140 F/g at a current density of about 1 and about 20 A/g, respectively, comparable to the device in aqueous electrolyte (FIG. 6a,b). Due to the high packing density of about 1.12 g/cm$^3$ and high volume ratio of HGP electrodes, the entire device showed a superior volumetric capacitance of about 34 F/cm$^3$ at about 1 A/g, which significantly outperforms that of laser scribed graphene-based device (about 0.55 F/cm$^3$ at about 1 A/g). Furthermore, the HGP-based solid-state supercapacitor showed excellent mechanical flexibility with almost the same electrochemical behavior even at a small bending radius of about 2 mm (FIG. 6c), and superior cycling stability with about 90% capacitance retention over 20,000 charge/discharge cycles at a high current density of about 10 A/g under bending state (FIG. 6d). Additionally, the solid-state device demonstrated a low self-discharge characteristic similar to that of commercial supercapacitors (FIG. 13), thus holding a great potential for powering flexible and wearable electronic products.

Figure 7:
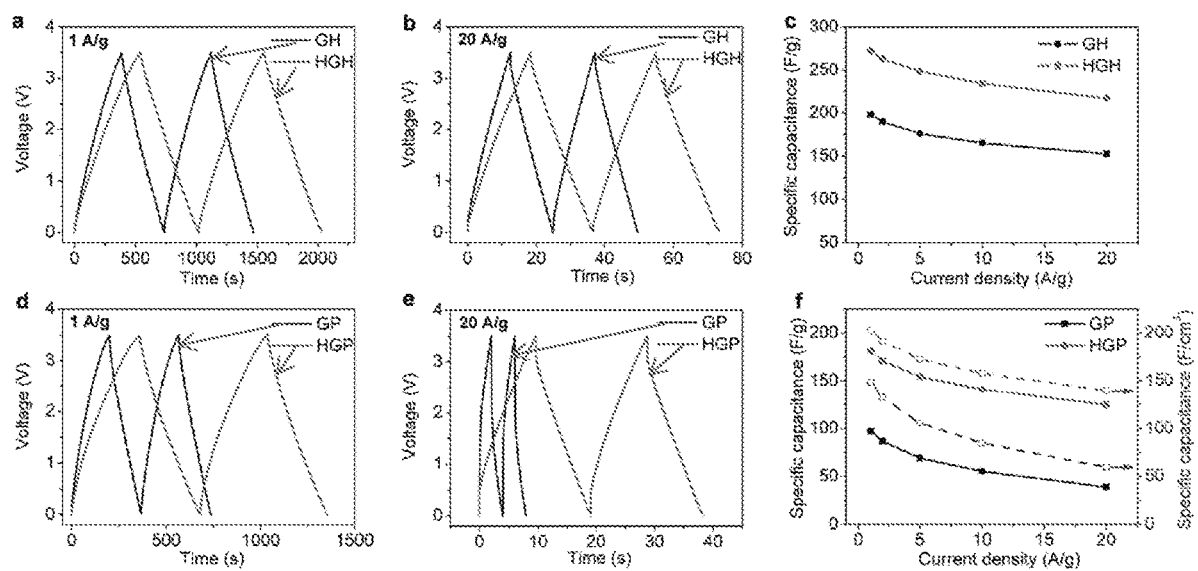
FIG. 7: Electrochemical characterizations of HGH- and HGP-based supercapacitors in organic electrolyte (about 2.0 M 1-ethyl-3-methylimidazolium tetrafluoroborate in acetonitrile) with GH and GP for comparison. (a,b) Galvanostatic charge/discharge curves of HGH- and GH-based supercapacitors at a current density of about 1 A/g (a) and about 20 A/g (b), respectively. (c) Specific capacitances versus current densities for HGH- and GH-based supercapacitors. (d,e) Galvanostatic charge/discharge curves of HGP- and GP-based supercapacitors at a current density of about 1 A/g (d) and about 20 A/g (e), respectively. (f) Specific capacitances versus current densities for HGP- and GP-based supercapacitors.

For achieving higher energy density, evaluation was performed of the electrochemical performances of HGH- and HGP-based supercapacitors in organic electrolyte (about 2.0 M 1-ethyl-3-methylimidazolium tetrafluoroborate (EMIMBF$_4$) in acetonitrile (AN)) (FIG. 7). With this electrolyte the operating voltage of the device can be extended from about 1.0 V to about 3.5 V. With a highly accessible porosity arising from the holey graphene building block, the HGH and HGP could deliver a specific capacitance of about 272 and about 181 F/g respectively at a current density of about 1 A/g, much higher than that of GH (about 198 F/g) and GP (about 97 F/g). Thus, a high energy density of about 116 and about 77 Wh/kg can be achieved for HGH and HGP, respectively. Moreover, the HGP showed a high volumetric capacitance of about 203 F/cm$^3$ and a high volumetric energy density of about 86 Wh/L. It is worth noting that the capacitive energy storage performances of HGH- and HGP-based supercapacitors in aqueous, polymer gel, and organic electrolytes are comparable to or better than those of the best carbon nanomaterials reported to date (Table 1 and 2), thus making these holey graphene macrostructures highly desirable electrode materials for next-generation high-performance supercapacitors.

In summary, this example has reported a convenient and scalable defect-etching strategy to prepare solution processable HGO with abundant nanopores across the entire basal plane. The processable HGO can be directly self-assembled into monolithic HGHs with a hierarchical 3D porosity. Meanwhile, the reduction of HGO dispersion can produce solution processable HG which can be further assembled into flexible HGPs with a compact but porous layered structure. Due to the significantly enhanced ion diffusion and surface access afforded by nanopores in the holey graphene building block, both HGH and HGP show superior capacitive energy storage performance in various electrolytes, which is better than those of non-holey graphene counterparts but also comparable to or better than those of the best carbon nanomaterials. This example provides a scalable pathway to solution processable holey graphene material and its derived macrostructures with remarkable electrochemical performance, which can address the challenge for the applications of graphene in the electrochemical energy storage devices and beyond. The HGH and HGP structures may also function as superior catalyst supports for fuel cells and batteries. The HGO or HG dispersion can also be processed into thin films or membranes with well-controlled porous structures for water purification, desalination, air filtration, and so forth.

Experimental Methods

Graphene Oxide (GO) Synthesis and Purification:

GO was prepared by oxidation of natural graphite powder according to the modified Hummers' method. Briefly, graphite (about 3.0 g) was added to concentrated sulfuric acid (about 70 mL) under stirring at room temperature, then sodium nitrate (about 1.5 g) was added, and the mixture was cooled to about 0° C. Under vigorous agitation, potassium permanganate (about 9.0 g) was added slowly to keep the temperature of the suspension lower than about 20° C. Successively, the reaction system was transferred to about 35-40° C. water bath for about 0.5 h, forming a thick paste. Then, about 140 mL of water was added, and the solution was stirred for another about 15 min. An additional about 500 mL of water was added followed by a slow addition of about 20 mL of $H_2O_2$ (about 30%), turning the color of the solution from brown to yellow. The mixture was filtered and washed with about 1:10 HCl aqueous solution (about 250 mL) to remove metal ions followed by repeated washing with water and centrifugation to remove the acid. The resulting solid was dispersed in water by ultrasonication for about 1 h to yield a GO aqueous dispersion (about 0.5 wt. %). The obtained brown dispersion was then subjected to about 30 min of centrifugation at 4000 rpm to remove any aggregates. Finally, it was purified by dialysis for one week to remove the remaining salt impurities for the following experiments.

Preparation of Solution Processable Holey Graphene Oxide (HGO):

HGO was prepared according to the following procedure: Typically, about 5 mL of about 30% $H_2O_2$ aqueous solution was mixed with about 50 mL of about 2 mg/mL GO aqueous dispersion and then heated at about 100° C. for about 4 h under stirring. The as-prepared HGO was purified by centrifuging and washing the above mixture to remove the residual $H_2O_2$ and then re-dispersed in water (or another suitable re-dispersal solvent) by vibration or ultrasonication for a few tens of seconds to produce a homogeneous HGO aqueous dispersion with a concentration of about 2 mg/mL.

The preparation of HGO can be readily scaled up. Control GO (cGO) was prepared by a similar method without adding $H_2O_2$.

Preparation of Reduced Holey Graphene Oxide Hydrogels (HGHs):

HGHs were prepared according to the following procedure: about 0.5 mL of about 1 M sodium ascorbate aqueous solution was added into about 10 mL of about 2 mg/mL HGO aqueous dispersion and then the homogeneous mixture was heated at about 100° C. for about 2 h without stirring. The as-prepared HGHs were taken out of the vial with a tweezer and immersed in pure water to remove any impurities for the following experiments. The size and shape of HGH can be readily controlled by changing the type of reactors. Reduced graphene oxide hydrogels (GHs) were also prepared under the same condition with GO as the starting material for comparison.

Preparation of Solution Processable Reduced Holey Graphene Oxide (HG) and its Free-Standing Paper (HGP):

HG aqueous dispersion was prepared according to the following procedure. Briefly, about 175 µL ammonia solution (about 28 wt. % in water) and about 25 µL hydrazine solution (about 35 wt. % in water) were mixed with about 50 mL of about 0.25 mg/mL HGO aqueous dispersion and then heated at about 95° C. for about 1 h without stirring to produce a homogeneous black HG dispersion. The HGP was prepared by vacuum filtration of the HG aqueous dispersion through an Anodisc membrane filter (about 47 mm in diameter, about 0.2 mm pore size; Whatman) followed by vacuum drying at room temperature. The typical thickness of the HGP was about 9 µm. Reduced graphene oxide dispersion and reduced graphene oxide paper (GP) were also prepared under the same condition with GO as the starting material for comparison.

Fabrication of GH- and HGH-Based Supercapacitors with Aqueous and Organic Electrolyte:

Slices of HGH with a thickness of about 1 mm were first cut from the purified cylindrical HGHs. For assembly of supercapacitors with aqueous electrolyte, the HGH slices were immersed in about 1.0 M $H_2SO_4$ aqueous electrolyte for about 12 h under stirring to exchange their interior water with electrolyte. For assembly of supercapacitors with organic electrolyte, the HGH slices were first immersed in pure ionic liquid 1-ethyl-3-methylimidazolium tetrafluoroborate ($EMIMBF_4$) under vacuum at about 100° C. for about 12 h to exchange their interior water with $EMIMBF_4$ and then transferred to about 2.0 M $EMIMBF_4$ in acetonitrile (AN) solution for another about 12 h. Subsequently, the HGH slices solvated with aqueous and organic electrolytes were placed on platinum or aluminum foils, and compressed using hydraulic press at a rate of about 0.5 cm during which the squeezed electrolytes were removed by filter papers. The samples were kept under about 100 MPa pressure for about 1 min to form well-adhered films with a packing density of about 0.66 g/cm$^3$ on the metal foils. Next, two same HGH films (both with a net-weight of about 1 mg and an areal mass of about 1 mg/cm$^2$) on separate metal foils were directly used as electrodes without any other additives or further treatments such as drying and thermal annealing, and separated by an ion-porous separator (Celgard® 3501) soaked with electrolytes. All of the components were assembled into a layered structure and tightly sealed by parafilm for electrochemical measurements. The assembly of supercapacitors with $EMIMBF_4$/AN electrolyte was prepared in a glove box filled with Ar. The GH-based supercapacitors were fabricated under the same condition for comparison.

Fabrication of GP- and HGP-Based Supercapacitors with Aqueous and Organic Electrolyte:

Rectangular HGP pieces with sizes of about 1 cm$^2$ and an areal mass of about 1 mg/cm$^2$ were first cut from the pristine HGP. For assembly of supercapacitors with aqueous electrolyte, the HGP pieces were immersed in about 1.0 M H$_2$SO$_4$ aqueous electrolyte for about 12 h under stirring. For assembly of supercapacitors with organic electrolyte, the HGP pieces were immersed in about 2.0 M EMIMBF$_4$ in AN solution under stirring for about 12 h. Then, the HGP pieces were attached onto metal foils and separated by an ion-porous separator (Celgard® 3501) soaked with electrolytes. All of the components were assembled into a layered structure by sandwiching the entire supercapacitor device between two rigid glass slides using clips and tightly sealed by parafilm for electrochemical measurements. The GP-based supercapacitors were fabricated under the same condition for comparison.

Fabrication of HGP-Based Flexible Solid-State Supercapacitors:

First, the H$_2$SO$_4$-polyvinyl alcohol (PVA) gel electrolyte was prepared as follows: about 1 g of H$_2$SO$_4$ was added into about 10 mL of de-ionized water, and then about 1 g of PVA power was added. The whole mixture was heated to about 85° C. under stirring until the solution became clear. Second, two HGP strips were immersed in the hot solution for about 15 min with a small part kept out for electrical connection and then taken out for air-drying at room temperature for about 12 h to evaporate excess water. Then the two electrodes were pressed together under a pressure of about 1 MPa for about 10 min, which allowed the polymer gel electrolyte on each electrode to combine into one thin separating layer to form an integrated device. The typical thickness of the whole device was about 30 μm determined by a screw micrometer.

Structural Characterization and Analysis:

The morphologies of HGO, HGH and HGP were characterized by scanning electron microscopy (SEM) (JEOL 6700) and transmission electron microscopy (TEM) (FEI CM120). Raman spectra were recorded on a RM 2000 Microscopic confocal Raman spectrometer (Renishaw) using a 514 nm laser beam. Methylene blue (MB) dye adsorption method was employed to measure specific surface areas. MB adsorption is a standard method for measuring the specific surface area of graphitic materials, with 1 mg of adsorbed MB molecules covering 2.54 m$^2$ of surface area. The specific surface areas were calculated by adding a piece of GH, HGH, GP or HGP into a standard concentration of MB in de-ionized water for a total of 24 h to reach adsorption equilibrium. The MB concentration was determined by analyzing the supernatant through UV-vis spectroscopy at a wavelength of 665 nm and compared to the initial standard concentration of MB prior to interacting with the material.

Electrochemical Characterization and Analysis:

All of the electrochemical experiments were carried out using VersaSTAT 4 from Princeton Applied Research. The electrochemical impedance spectroscopy measurements were performed at open circuit potential with a sinusoidal signal over a frequency range from about 100 kHz to about 10 mHz at an amplitude of about 10 mV. The cycle life tests were conducted by galvanostatic charge/discharge measurements. The specific capacitances ($C_{wt}$) derived from galvanostatic discharge curves were calculated based on the following formula: $C_{wt}=2(I\Delta t)/(m\Delta V)$, where I is the constant discharge current, $\Delta t$ is the time for a full discharge, m is the net mass of one electrode, and $\Delta V$ represents voltage drop upon discharging (excluding the IR drop). The corresponding volumetric capacitances ($C_{vol}$) were calculated using: $C_{vol}=C_{wt}\times\rho$, where $\rho$ is the packing density of graphene in electrode films. The energy density against two electrodes in a device was calculated using the following formula: $E_{wt}=C_{wt}V^2/8$ and $E_{vol}=C_{vol}V^2/8$, respectively, where V is the operating voltage. For the leakage current test, the device was first charged to about 1.0 V at about 2 mA and then the potential was kept at about 1.0 V for about 2 h while acquiring the current data. For the self-discharge test, the device was first charged to about 1.0 V at about 2 mA and kept at about 1.0 V for about 15 min, and then the open potential of the device was recorded as a function of time.

TABLE 1

Capacitive performance of representative porous carbon nanomaterials in aqueous and organic electrolytes based on an electrical double-layer mechanism.

| Materials | Packing density/ g cm$^{-3}$ | Aqueous electrolyte | | Organic electrolyte | | | | |
|---|---|---|---|---|---|---|---|---|
| | | $C_{wt}$/F g$^{-1}$ (current density) | $C_{vol}$/ F cm$^{-3}$ | Electrolyte (voltage) | $C_{wt}$/F g$^{-1}$ (current density) | $C_{vol}$/ F cm$^{-3}$ | $E_{wt}$/ Wh kg$^{-1}$ | $E_{vol}$/ Wh L$^{-1}$ |
| Single-walled carbon nanotubes (CNTs) arrays | 0.5 | NA | NA | Et$_4$NBF$_4$/PC (4.0 V) | 160 (1.0 A/g) | 80 | 94 | 47 |
| Commercial activated carbon | 0.5~0.7 | 150~200 | 80~110 | Et$_4$NBF$_4$/AN (2.5~3.0 V) | 80~120 | 48~84 | 20~30 | 12~21 |
| Carbide derived carbon | 0.53 | NA | NA | EMIMTFSI (3.0 V) | 160 (0.3 A/g) | 85 | 50 | 26.5 |
| Chemically modified graphene | 0.5 | 135 (1.33 A/g) | 67.5 | Et$_4$NBF$_4$/AN (2.5 V) | 99 (1.33 A/g) | 49.5 | 21.5 | 10.7 |
| Laser scribed graphene | 0.048 | 202 (1 A/g) | 9.7 | EMIMBF$_4$ (3.5 V) | 276 (5.0 A/g) | 13.2 | 117.4 | 5.6 |
| Curved graphene | 0.3 | NA | NA | EMIMBF$_4$ (4.0 V) | 154 (1.0 A/g) | 46.2 | 85.6 | 25.7 |
| Activated graphene | 0.4 | 324 (1 A/g) | 123 | EMIMBF$_4$ (3.5 V) | 231 (1.0 A/g) | 92 | 98 | 39 |

TABLE 1-continued

Capacitive performance of representative porous carbon nanomaterials in aqueous and organic electrolytes based on an electrical double-layer mechanism.

| | | Aqueous electrolyte | | Organic electrolyte | | | | |
|---|---|---|---|---|---|---|---|---|
| Materials | Packing density/ g cm$^{-3}$ | $C_{wt}$/F g$^{-1}$ (current density) | $C_{vol}$/ F cm$^{-3}$ | Electrolyte (voltage) | $C_{wt}$/F g$^{-1}$ (current density) | $C_{vol}$/ F cm$^{-3}$ | $E_{wt}$/ Wh kg$^{-1}$ | $E_{vol}$/ Wh L$^{-1}$ |
| Activated microwave-expanded graphite oxide (a-MEGO) | 0.36 | NA | NA | BMIMBF$_4$/AN (3.5 V) | 165 (1.4 A/g) | 59.8 | 70.6 | 25.4 |
| Compressed a-MEGO | 0.75 | NA | NA | BMIMBF$_4$/AN (3.5 V) | 147 (1.2 A/g) | 110 | 63 | 48 |
| asMEGO | 0.59 | NA | NA | EMIMTFSI/AN (3.5 V) | 173 (2.1 A/g) | 102 | 74 | 44 |
| Electrolyte-mediated graphene | 1.25~1.33 | 171 (1 A/g) | 227 | EMIMBF$_4$/AN (3.5 V) | 167 (1.0 A/g) | 209 | 71 | 89 |
| N-doped graphene | NA | 280 (1.0 A/g) | NA | Et$_4$NBF$_4$/AN (2.5 V) | 220 (1.0 A/g) | NA | 48 | NA |
| Reduced graphene oxide | NA | 205 (0.1 A/g) | NA | NA | NA | NA | NA | NA |
| Thermal expanded graphene oxide | NA | 264 (0.1 A/g) | NA | Et$_4$NBF$_4$/AN (1.75 V) | 120 (0.1 A/g) | NA | 12.8 | NA |
| HGH | 0.66 | 283 (1.0 A/g) | 187 | EMIMBF$_4$/AN (3.5 V) | 272 (1.0 A/g) | 180 | 116 | 76 |
| HGP | 1.12 | 209 (1.0 A/g) | 234 | EMIMBF$_4$/AN (3.5 V) | 181 (1.0 A/g) | 203 | 77 | 86 |

Note:
The specific capacitance values shown in the Table 1 are typically based on the mass of active electrode materials. In contrast to the additive-free HGH and HGP electrodes of this example, either, or both, polymer binder (usually polytetrafluoroethylene) and conductive additive (usually carbon black) are used to mix with active materials to make supercapacitor electrodes. These additives account for about 10-20 wt. % of the overall electrode materials, which will further decrease the specific capacitances when normalized to the total mass of electrodes.

TABLE 2

Capacitive performance of representative flexible solid-state supercapacitors based on carbon nanotubes (CNTs) and graphene films with an electrical double-layer mechanism.

| Materials | Substrate | Mass loading | Electrode thickness | Packing density/ g cm$^{-3}$ | $C_{wt}$/F g$^{-1}$ (current density) | $C_{vol}$/ F cm$^{-3}$ | Device thickness |
|---|---|---|---|---|---|---|---|
| Single-walled CNTs | PET | 33.3 μg/cm$^2$ | about 0.6 μm | 0.56 | 110 (1.0 A/g) | 61.6 | NA |
| CNTs | Paper | 0.23 mg/cm$^2$ | NA | NA | 80 (1.0 A/g) | NA | 720 μm |
| Single-walled CNTs | Paper | NA | NA | NA | 115.8 (1.0 A/g) | NA | 1.3 mm |
| Laser scribed graphene | PET or Al foil | 36.3 μg/cm$^2$ | about 7.6 μm | 0.048 | 203.8 (1.0 A/g) | 9.8 | 68 μm |
| Graphene | Paper | 0.68 mg/cm$^2$ | NA | NA | 68.1 (1.0 A/g) | NA | NA |
| Graphene | PET | NA | about 5 μm | NA | 118.5 (1.0 A/g) | NA | NA |
| Graphene | None | NA | about 1 μm | NA | 85 (1.0 A/g) | NA | NA |
| Graphene | PI | 2 mg/cm$^2$ | about 120 μm | 0.17 | 186 (1.0 A/g) | 32 | NA |
| Doped graphene | None | NA | NA | NA | 124 (5 mV/s) | NA | NA |
| HGP | None | 1 mg/cm$^2$ | about 9 μm | 1.12 | 201 (1.0 A/g) | 225 | ~30 μm |

Note:
Most of other flexible solid-state supercapacitors use substrates for loading the electrode materials. Meanwhile, the mass loading and the packing density of the electrode materials are usually low. All of these factors can greatly decrease the ratio of electrode materials in the entire device and at the same time increase the total weight and volume of the entire device, which results in low specific capacitances when normalized by the total weight or volume of the entire device.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the terms "connect," "connected," and "connection" refer to an operational coupling or linking. Connected objects can be directly coupled to one another or can be indirectly coupled to one another, such as via another set of objects.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A method of forming a graphene-based material, comprising:

treating a mixture comprising an etchant and graphene oxide sheets to yield formation of holey graphene oxide sheets comprising basal plane nanopores, wherein the etchant is hydrogen peroxide that carries out an etching reaction on the graphene oxide sheets to generate the basal plane nanopores;

dispersing the holey graphene oxide sheets in a re-dispersal solvent to yield a holey graphene oxide dispersion including the holey graphene oxide sheets;

incorporating electrochemically active material nano structures, catalyst nano structures, or both, into the holey graphene oxide dispersion; and treating the holey graphene oxide dispersion with a reducing agent to yield an interconnected network of holey graphene sheets having in-plane nanopores.

2. The method of claim 1, further comprising loading a pseudo-capacitive material onto the holey graphene oxide sheets, prior to the treating of the holey graphene oxide dispersion with the reducing agent.

3. The method of claim 1, further comprising incorporating a pseudo-capacitive material into the graphene-based material, subsequent to the treating of the holey graphene oxide dispersion with the reducing agent.

4. A method of forming a graphene-based material, comprising:

treating a mixture comprising an etchant and graphene oxide sheets to yield formation of holey graphene oxide sheets comprising basal plane nanopores, wherein the etchant is hydrogen peroxide that carries out an etching reaction on the graphene oxide sheets to generate the basal plane nanopores;

dispersing the holey graphene oxide sheets in a re-dispersal solvent to yield a holey graphene oxide dispersion;

treating the holey graphene oxide dispersion with a reducing agent to yield a holey graphene dispersion including holey graphene sheets;

incorporating electrochemically active material nano structures, catalyst nano structures, or both, into the holey graphene dispersion; and subjecting the holey graphene dispersion to compaction to yield an interconnected network of holey graphene sheets having in-plane nanopores.

5. The method of claim 4, wherein subjecting the holey graphene dispersion to compaction includes performing flow-assisted compaction of the holey graphene dispersion through a filter.

6. The method of claim 4, further comprising loading a pseudo-capacitive material onto the holey graphene sheets, prior to compaction of the holey graphene sheets.

7. The method of claim 4, further comprising incorporating a pseudo-capacitive material into the graphene-based material, subsequent to compaction of the holey graphene sheets.

8. A dispersion of a graphene-based material, comprising:
    a solvent;
    holey graphene oxide sheets dispersed in the solvent, wherein the holey graphene oxide sheets have in-plane nanopores; and
    electrochemically active material nanostructures, catalyst nanostructures, or both, dispersed in the solvent.

9. The dispersion of claim 8, wherein the nanopores have sizes up to about 50 nm.

10. The dispersion of claim 8, wherein the electrochemically active material nanostructures decorate the holey graphene oxide sheets.

11. The dispersion of claim 8, wherein the electrochemically active material nanostructures comprise inorganic nano structures.

12. A dispersion of a graphene-based material, comprising:
    a solvent;
    holey graphene sheets dispersed in the solvent, wherein the holey graphene sheets have in-plane nanopores; and
    electrochemically active material nanostructures, catalyst nanostructures, or both, dispersed in the solvent.

13. The dispersion of claim 12, wherein the nanopores have sizes up to about 50 nm.

14. The dispersion of claim 12, wherein the electrochemically active material nanostructures decorate the holey graphene sheets.

15. The dispersion of claim 12, wherein the electrochemically active material nanostructures comprise inorganic nano structures.

16. A method of using the dispersion of claim 8, comprising:
   forming an ink composition including the dispersion; and
   coating the ink composition to form a thin film.

17. The method of claim 1, wherein the re-dispersal solvent includes water.

18. The method of claim 1, wherein the nanopores have sizes up to about 50 nm.

19. The method of claim 1, wherein treating the mixture comprises heating the mixture to between about 50° C. and about 200° C.

20. The method of claim 4, wherein treating the mixture comprises heating the mixture to between about 50° C. and about 200° C.

* * * * *